US011238553B2

(12) United States Patent
Hodge

(10) Patent No.: US 11,238,553 B2
(45) Date of Patent: *Feb. 1, 2022

(54) DETECTION AND PREVENTION OF INMATE TO INMATE MESSAGE RELAY

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,418

(22) Filed: Feb. 24, 2020

(65) Prior Publication Data

US 2020/0242716 A1 Jul. 30, 2020

Related U.S. Application Data

(63) Continuation of application No. 15/071,082, filed on Mar. 15, 2016, now Pat. No. 10,572,961.

(51) Int. Cl.
*G06Q 50/26* (2012.01)
*G06F 16/25* (2019.01)
(Continued)

(52) U.S. Cl.
CPC ....... *G06Q 50/26* (2013.01); *G06F 16/24578* (2019.01); *G06F 16/258* (2019.01);
(Continued)

(58) Field of Classification Search
None
See application file for complete search history.

(56) References Cited

U.S. PATENT DOCUMENTS 4,054,756 A 10/1977 Comella et al.
4,191,860 A 3/1980 Weber
(Continued)

FOREIGN PATENT DOCUMENTS

EP 1280137 B1 12/2004
EP 2579676 A1 4/2013
(Continued)

OTHER PUBLICATIONS

"Cisco IAD2400 Series Business-Class Integrated Access Device", Cisco Systems Datasheet, 2003; 8 pages.
(Continued)

*Primary Examiner* — Chris Parry
*Assistant Examiner* — Chouat Abderrahmen
(74) *Attorney, Agent, or Firm* — Sterne, Kessler, Goldstein & Fox P.L.L.C.

(57) ABSTRACT

Secure system and method of detecting and preventing inmate to inmate message relays. A system and method which monitors inmate communications for similar phrases that occur as part of two or more separate inmate messages. These similar phrases may be overlapping in real time as in a conference call or can occur at separate times in separate messages. The communications that appear similar are assigned a score and the score is compared to a threshold. If the score is above a certain threshold, the communication is flagged and remedial actions are taken. If the flagged communication contains illegal matter then the communication can be disconnected or restricted in the future.

20 Claims, 8 Drawing Sheets

(51) Int. Cl.

| | |
|---|---|
| *G06F 16/33* | (2019.01) |
| *G06F 16/2457* | (2019.01) |
| *H04M 3/22* | (2006.01) |
| *H04M 3/38* | (2006.01) |
| *H04M 3/42* | (2006.01) |
| *G06F 40/242* | (2020.01) |
| *G10L 15/02* | (2006.01) |
| *G10L 15/26* | (2006.01) |
| *G10L 25/51* | (2013.01) |
| *H04L 12/26* | (2006.01) |
| *H04L 12/58* | (2006.01) |
| *G10L 15/00* | (2013.01) |
| *G10L 15/08* | (2006.01) |

(52) U.S. Cl.
CPC ........ *G06F 16/3344* (2019.01); *G06F 40/242* (2020.01); *G10L 15/02* (2013.01); *G10L 15/26* (2013.01); *G10L 25/51* (2013.01); *H04L 43/16* (2013.01); *H04L 51/046* (2013.01); *H04M 3/2281* (2013.01); *H04M 3/38* (2013.01); *H04M 3/42221* (2013.01); *G10L 15/005* (2013.01); *G10L 2015/088* (2013.01); *H04M 2201/18* (2013.01); *H04M 2201/40* (2013.01); *H04M 2203/2061* (2013.01)

(56) References Cited

U.S. PATENT DOCUMENTS

| | | |
|---|---|---|
| 4,670,628 A | 6/1987 | Boratgis et al. |
| 4,691,347 A | 9/1987 | Stanley et al. |
| 4,737,982 A | 4/1988 | Boratgis et al. |
| 4,813,070 A | 3/1989 | Humphreys et al. |
| 4,907,221 A | 3/1990 | Pariani et al. |
| 4,918,719 A | 4/1990 | Daudelin |
| 4,935,956 A | 6/1990 | Hellwarth et al. |
| 4,943,973 A | 7/1990 | Werner |
| 4,995,030 A | 2/1991 | Helf |
| 5,185,781 A | 2/1993 | Dowden et al. |
| 5,210,789 A | 5/1993 | Jeffus et al. |
| 5,229,764 A | 7/1993 | Matchett et al. |
| 5,291,548 A | 3/1994 | Tsumura et al. |
| 5,319,702 A | 6/1994 | Kitchin et al. |
| 5,319,735 A | 6/1994 | Preuss et al. |
| 5,345,501 A | 9/1994 | Shelton |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,469,370 A | 11/1995 | Ostrover et al. |
| 5,485,507 A | 1/1996 | Brown et al. |
| 5,502,762 A | 3/1996 | Andrew et al. |
| 5,517,555 A | 5/1996 | Amadon et al. |
| 5,535,194 A | 7/1996 | Brown et al. |
| 5,535,261 A | 7/1996 | Brown et al. |
| 5,539,731 A | 7/1996 | Haneda et al. |
| 5,539,812 A | 7/1996 | Kitchin et al. |
| 5,555,551 A | 9/1996 | Rudokas et al. |
| 5,583,925 A | 12/1996 | Bernstein |
| 5,590,171 A | 12/1996 | Howe |
| 5,592,548 A | 1/1997 | Sih |
| 5,613,004 A | 3/1997 | Cooperman |
| 5,619,561 A | 4/1997 | Reese |
| 5,627,887 A | 5/1997 | Freedman |
| 5,634,086 A | 5/1997 | Rtischev et al. |
| 5,634,126 A | 5/1997 | Norell |
| 5,636,292 A | 6/1997 | Rhoads |
| 5,640,490 A | 6/1997 | Hansen et al. |
| 5,646,940 A | 7/1997 | Hotto |
| 5,649,060 A | 7/1997 | Ellozy et al. |
| 5,655,013 A | 8/1997 | Gainsboro |
| 5,675,704 A | 10/1997 | Juang et al. |
| 5,687,236 A | 11/1997 | Moskowitz |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,355 A | 6/1998 | Salibrici |
| 5,768,426 A | 6/1998 | Rhoads |
| 5,774,452 A | 6/1998 | Greenberg |
| 5,793,415 A | 8/1998 | Gregory, III et al. |
| 5,796,811 A | 8/1998 | McFarlen |
| 5,805,685 A | 9/1998 | McFarlen |
| 5,809,462 A | 9/1998 | Nussbaum |
| 5,822,432 A | 10/1998 | Moskowitz |
| 5,822,436 A | 10/1998 | Rhoads |
| 5,832,068 A | 11/1998 | Smith |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,861,810 A | 1/1999 | Nguyen |
| 5,862,260 A | 1/1999 | Rhoads |
| 5,867,562 A | 2/1999 | Scherer |
| 5,883,945 A | 3/1999 | Richardson et al. |
| 5,889,868 A | 3/1999 | Seraphim et al. |
| 5,899,972 A | 5/1999 | Miyazawa et al. |
| 5,907,602 A | 5/1999 | Peel et al. |
| 5,915,001 A | 6/1999 | Uppaluru |
| 5,920,834 A | 7/1999 | Sih et al. |
| 5,923,746 A | 7/1999 | Baker et al. |
| 5,926,533 A | 7/1999 | Gainsboro |
| 5,930,369 A | 7/1999 | Cox et al. |
| 5,930,377 A | 7/1999 | Powell et al. |
| 5,937,035 A | 8/1999 | Andruska et al. |
| 5,953,049 A | 9/1999 | Horn et al. |
| 5,960,080 A | 9/1999 | Fahlman et al. |
| 5,963,909 A | 10/1999 | Warren et al. |
| 5,982,891 A | 11/1999 | Ginter et al. |
| 5,991,373 A | 11/1999 | Pattison et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Trump |
| 6,038,315 A | 3/2000 | Strait et al. |
| 6,052,454 A | 4/2000 | Kek et al. |
| 6,052,462 A | 4/2000 | Lu |
| 6,058,163 A | 5/2000 | Pattison et al. |
| 6,064,963 A | 5/2000 | Gainsboro |
| 6,072,860 A | 6/2000 | Kek et al. |
| 6,078,567 A | 6/2000 | Traill et al. |
| 6,078,645 A | 6/2000 | Cai et al. |
| 6,078,807 A | 6/2000 | Dunn et al. |
| 6,111,954 A | 8/2000 | Rhoads |
| 6,118,860 A | 9/2000 | Hillson et al. |
| 6,122,392 A | 9/2000 | Rhoads |
| 6,122,403 A | 9/2000 | Rhoads |
| 6,138,119 A | 10/2000 | Hall et al. |
| 6,141,406 A | 10/2000 | Johnson |
| 6,160,903 A | 12/2000 | Hamid et al. |
| 6,173,284 B1 | 1/2001 | Brown |
| 6,175,831 B1 | 1/2001 | Weinreich et al. |
| 6,185,416 B1 | 2/2001 | Rudokas et al. |
| 6,185,683 B1 | 2/2001 | Ginter et al. |
| 6,205,249 B1 | 3/2001 | Moskowitz |
| 6,211,783 B1 | 4/2001 | Wang |
| 6,219,640 B1 | 4/2001 | Basu et al. |
| 6,233,347 B1 | 5/2001 | Chen et al. |
| 6,237,786 B1 | 5/2001 | Ginter et al. |
| 6,243,480 B1 | 6/2001 | Zhao et al. |
| 6,243,676 B1 | 6/2001 | Witteman |
| 6,253,193 B1 | 6/2001 | Ginter et al. |
| 6,263,507 B1 | 7/2001 | Ahmad et al. |
| 6,266,430 B1 | 7/2001 | Rhoads |
| 6,278,772 B1 | 8/2001 | Bowater et al. |
| 6,278,781 B1 | 8/2001 | Rhoads |
| 6,289,108 B1 | 9/2001 | Rhoads |

(56) References Cited

U.S. PATENT DOCUMENTS

| | | |
|---|---|---|
| 6,301,360 B1 | 10/2001 | Bocionek et al. |
| 6,308,171 B1 | 10/2001 | De La Huerga |
| 6,312,911 B1 | 11/2001 | Bancroft |
| 6,314,192 B1 | 11/2001 | Chen et al. |
| 6,324,573 B1 | 11/2001 | Rhoads |
| 6,324,650 B1 | 11/2001 | Ogilvie |
| 6,330,335 B1 | 12/2001 | Rhoads |
| 6,343,138 B1 | 1/2002 | Rhoads |
| 6,343,738 B1 | 2/2002 | Ogilvie |
| 6,345,252 B1 | 2/2002 | Beigi et al. |
| 6,381,321 B1 | 4/2002 | Brown et al. |
| 6,389,293 B1 | 5/2002 | Clore et al. |
| 6,421,645 B1 | 7/2002 | Beigi et al. |
| 6,526,380 B1 | 2/2003 | Thelen et al. |
| 6,542,602 B1 | 4/2003 | Elazar |
| 6,611,583 B1 | 8/2003 | Gainsboro |
| 6,625,261 B2 | 9/2003 | Holtzberg |
| 6,625,587 B1 | 9/2003 | Erten et al. |
| 6,633,846 B1 | 10/2003 | Bennett et al. |
| 6,636,591 B1 | 10/2003 | Swope et al. |
| 6,639,977 B1 | 10/2003 | Swope et al. |
| 6,639,978 B2 | 10/2003 | Draizin et al. |
| 6,647,096 B1 | 11/2003 | Milliorn et al. |
| 6,665,376 B1 | 12/2003 | Brown |
| 6,665,644 B1 | 12/2003 | Kanevsky et al. |
| 6,668,044 B1 | 12/2003 | Schwartz et al. |
| 6,668,045 B1 | 12/2003 | Mow |
| 6,671,292 B1 | 12/2003 | Haartsen |
| 6,688,518 B1 | 2/2004 | Valencia et al. |
| 6,728,345 B2 | 4/2004 | Glowny et al. |
| 6,728,682 B2 | 4/2004 | Fasciano |
| 6,748,356 B1 | 6/2004 | Beigi et al. |
| 6,760,697 B1 | 7/2004 | Neumeyer et al. |
| 6,763,099 B1 | 7/2004 | Blink |
| 6,782,370 B1 | 8/2004 | Stack |
| 6,788,772 B2 | 9/2004 | Barak et al. |
| 6,810,480 B1 | 10/2004 | Parker et al. |
| 6,850,609 B1 | 2/2005 | Schrage |
| 6,880,171 B1 | 4/2005 | Ahmad et al. |
| 6,895,086 B2 | 5/2005 | Martin |
| 6,898,612 B1 | 5/2005 | Parra et al. |
| 6,907,387 B1 | 6/2005 | Reardon |
| 6,920,209 B1 | 7/2005 | Gainsboro |
| 6,947,525 B2 | 9/2005 | Benco |
| 6,970,554 B1 | 11/2005 | Peterson et al. |
| 7,032,007 B2 | 4/2006 | Fellenstein et al. |
| 7,035,386 B1 | 4/2006 | Susen et al. |
| 7,039,171 B2 | 5/2006 | Gickler |
| 7,039,585 B2 | 5/2006 | Wilmot et al. |
| 7,046,779 B2 | 5/2006 | Hesse |
| 7,050,918 B2 | 5/2006 | Pupalaikis et al. |
| 7,062,286 B2 | 6/2006 | Grivas et al. |
| 7,075,919 B1 | 7/2006 | Wendt et al. |
| 7,079,636 B1 | 7/2006 | McNitt et al. |
| 7,079,637 B1 | 7/2006 | McNitt et al. |
| 7,092,494 B1 | 8/2006 | Anders et al. |
| 7,103,549 B2 | 9/2006 | Bennett et al. |
| 7,106,843 B1 | 9/2006 | Gainsboro et al. |
| 7,123,704 B2 | 10/2006 | Martin |
| 7,133,511 B2 | 11/2006 | Buntin et al. |
| 7,133,828 B2 | 11/2006 | Scarano et al. |
| 7,133,845 B1 | 11/2006 | Ginter et al. |
| 7,149,788 B1 | 12/2006 | Gundla et al. |
| 7,191,133 B1 | 3/2007 | Pettay |
| 7,197,560 B2 | 3/2007 | Caslin et al. |
| 7,236,932 B1 | 6/2007 | Grajski |
| 7,248,685 B2 | 7/2007 | Martin |
| 7,256,816 B2 | 8/2007 | Profanchik et al. |
| 7,277,468 B2 | 10/2007 | Tian et al. |
| 7,280,816 B2 | 10/2007 | Fratti et al. |
| 7,324,637 B2 | 1/2008 | Brown et al. |
| 7,333,798 B2 | 2/2008 | Hodge |
| 7,366,782 B2 | 4/2008 | Chong et al. |
| 7,406,039 B2 | 7/2008 | Cherian et al. |
| 7,417,983 B2 | 8/2008 | He et al. |
| 7,424,715 B1 | 9/2008 | Dutton |
| 7,466,816 B2 | 12/2008 | Blair |
| 7,494,061 B2 | 2/2009 | Reinhold |
| 7,496,345 B1 | 2/2009 | Rae et al. |
| 7,505,406 B1 | 3/2009 | Spadaro et al. |
| 7,519,169 B1 | 4/2009 | Hingoranee et al. |
| 7,529,357 B1 | 5/2009 | Rae et al. |
| 7,551,732 B2 | 6/2009 | Anders |
| 7,596,498 B2 | 9/2009 | Basu et al. |
| 7,639,791 B2 | 12/2009 | Hodge |
| 7,664,243 B2 | 2/2010 | Martin |
| 7,672,845 B2 | 3/2010 | Beranek et al. |
| RE41,190 E | 4/2010 | Darling |
| 7,698,182 B2 | 4/2010 | Falcone et al. |
| 7,742,581 B2 | 6/2010 | Hodge et al. |
| 7,742,582 B2 | 6/2010 | Harper |
| 7,783,021 B2 | 8/2010 | Hodge |
| 7,804,941 B2 | 9/2010 | Keiser et al. |
| 7,826,604 B2 | 12/2010 | Martin |
| 7,848,510 B2 | 12/2010 | Shaffer et al. |
| 7,853,243 B2 | 12/2010 | Hodge |
| 7,860,222 B1 | 12/2010 | Sidler et al. |
| 7,881,446 B1 | 2/2011 | Apple et al. |
| 7,899,167 B1 | 3/2011 | Rae |
| 7,961,860 B1 | 6/2011 | McFarlen |
| 8,031,052 B2 | 10/2011 | Polozola |
| 8,135,115 B1 | 3/2012 | Hogg, Jr. et al. |
| 8,204,177 B2 | 6/2012 | Harper |
| 8,295,446 B1 | 10/2012 | Apple et al. |
| 8,458,732 B2 | 6/2013 | Hanna et al. |
| 8,488,756 B2 | 7/2013 | Hodge et al. |
| 8,498,937 B1 | 7/2013 | Shipman, Jr. et al. |
| 8,509,390 B2 | 8/2013 | Harper |
| 8,577,003 B2 | 11/2013 | Rae |
| 8,630,726 B2 | 1/2014 | Hodge et al. |
| 8,731,934 B2 | 5/2014 | Olligschlaeger et al. |
| 8,886,663 B2 | 11/2014 | Gainsboro et al. |
| 8,917,848 B2 | 12/2014 | Torgersrud et al. |
| 8,929,525 B1 | 1/2015 | Edwards |
| 9,020,115 B2 | 4/2015 | Hangsleben |
| 9,043,813 B2 | 5/2015 | Hanna et al. |
| 9,077,680 B2 | 7/2015 | Harper |
| 9,094,500 B1 | 7/2015 | Edwards |
| 9,143,609 B2 | 9/2015 | Hodge |
| 9,232,051 B2 | 1/2016 | Torgersrud et al. |
| 9,307,386 B2 | 4/2016 | Hodge et al. |
| 9,396,320 B2 | 7/2016 | Lindemann |
| 9,552,417 B2 | 1/2017 | Olligschlaeger et al. |
| 9,609,121 B1 | 3/2017 | Hodge |
| 9,615,060 B1 | 4/2017 | Hodge |
| 9,621,504 B2 | 4/2017 | Torgersrud et al. |
| 9,674,340 B1 | 6/2017 | Hodge |
| 9,800,830 B2 | 10/2017 | Humpries |
| 9,923,936 B2 | 3/2018 | Hodge |
| 10,572,961 B2 | 2/2020 | Hodge |
| 2001/0036821 A1 | 11/2001 | Gainsboro et al. |
| 2001/0043697 A1 | 11/2001 | Cox et al. |
| 2001/0056349 A1 | 12/2001 | St. John |
| 2001/0056461 A1 | 12/2001 | Kampe et al. |
| 2002/0002464 A1 | 1/2002 | Pertrushin |
| 2002/0010587 A1 | 1/2002 | Pertrushin |
| 2002/0032566 A1 | 3/2002 | Tzirkel-Hancock et al. |
| 2002/0046057 A1 | 4/2002 | Ross |
| 2002/0067272 A1 | 6/2002 | Lemelson et al. |
| 2002/0069084 A1 | 6/2002 | Donovan |
| 2002/0076014 A1 | 6/2002 | Holtzberg |
| 2002/0107871 A1 | 8/2002 | Wyzga et al. |
| 2002/0147707 A1 | 10/2002 | Kraay et al. |
| 2002/0174183 A1 | 11/2002 | Saeidi |
| 2003/0002639 A1 | 1/2003 | Huie |
| 2003/0023444 A1 | 1/2003 | St. John |
| 2003/0023874 A1 | 1/2003 | Prokupets et al. |
| 2003/0035514 A1 | 2/2003 | Jang |
| 2003/0040326 A1 | 2/2003 | Levy et al. |
| 2003/0070076 A1 | 4/2003 | Michael |
| 2003/0086546 A1 | 5/2003 | Falcone et al. |
| 2003/0093533 A1 | 5/2003 | Ezerzer et al. |
| 2003/0099337 A1 | 5/2003 | Lord |
| 2003/0126470 A1 | 7/2003 | Crites et al. |

(56) References Cited

U.S. PATENT DOCUMENTS

| | | | |
|---|---|---|---|
| 2003/0154072 A1* | 8/2003 | Young | G06F 16/40 |
| | | | 704/9 |
| 2003/0174826 A1 | 9/2003 | Hesse | |
| 2003/0190045 A1 | 10/2003 | Huberman et al. | |
| 2004/0008828 A1 | 1/2004 | Coles et al. | |
| 2004/0029564 A1 | 2/2004 | Hodge | |
| 2004/0081296 A1 | 4/2004 | Brown et al. | |
| 2004/0161086 A1 | 8/2004 | Buntin et al. | |
| 2004/0169683 A1 | 9/2004 | Chiu et al. | |
| 2004/0249650 A1 | 12/2004 | Freedman et al. | |
| 2004/0252184 A1 | 12/2004 | Hesse et al. | |
| 2004/0252447 A1 | 12/2004 | Hesse et al. | |
| 2005/0010411 A1 | 1/2005 | Rigazio et al. | |
| 2005/0027723 A1 | 2/2005 | Jones et al. | |
| 2005/0080625 A1 | 4/2005 | Bennett et al. | |
| 2005/0094794 A1 | 5/2005 | Creamer et al. | |
| 2005/0102371 A1 | 5/2005 | Aksu | |
| 2005/0114192 A1 | 5/2005 | Tor et al. | |
| 2005/0125226 A1 | 6/2005 | Magee | |
| 2005/0128283 A1 | 6/2005 | Bulriss et al. | |
| 2005/0141678 A1 | 6/2005 | Anders et al. | |
| 2005/0144004 A1 | 6/2005 | Bennett et al. | |
| 2005/0170818 A1 | 8/2005 | Netanel et al. | |
| 2005/0182628 A1 | 8/2005 | Choi | |
| 2005/0207357 A1 | 9/2005 | Koga | |
| 2006/0064037 A1 | 3/2006 | Shalon et al. | |
| 2006/0087554 A1 | 4/2006 | Boyd et al. | |
| 2006/0087555 A1 | 4/2006 | Boyd et al. | |
| 2006/0093099 A1 | 5/2006 | Cho | |
| 2006/0198504 A1 | 9/2006 | Shemisa et al. | |
| 2006/0200353 A1 | 9/2006 | Bennett | |
| 2006/0285650 A1 | 12/2006 | Hodge | |
| 2006/0285665 A1 | 12/2006 | Wasserblat et al. | |
| 2007/0003026 A1 | 1/2007 | Hodge et al. | |
| 2007/0011008 A1 | 1/2007 | Scarano et al. | |
| 2007/0041545 A1 | 2/2007 | Gainsboro | |
| 2007/0047734 A1 | 3/2007 | Frost | |
| 2007/0071206 A1 | 3/2007 | Gainsboro et al. | |
| 2007/0133437 A1 | 6/2007 | Wengrovitz et al. | |
| 2007/0185717 A1 | 8/2007 | Bennett | |
| 2007/0192174 A1 | 8/2007 | Bischoff | |
| 2007/0195703 A1 | 8/2007 | Boyajian et al. | |
| 2007/0237099 A1 | 10/2007 | He et al. | |
| 2007/0244690 A1 | 10/2007 | Peters | |
| 2008/0000966 A1 | 1/2008 | Keiser | |
| 2008/0021708 A1 | 1/2008 | Bennett et al. | |
| 2008/0046241 A1 | 2/2008 | Osburn et al. | |
| 2008/0096178 A1 | 4/2008 | Rogers et al. | |
| 2008/0106370 A1 | 5/2008 | Perez et al. | |
| 2008/0118045 A1 | 5/2008 | Polozola et al. | |
| 2008/0195387 A1 | 8/2008 | Zigel et al. | |
| 2008/0198978 A1* | 8/2008 | Olligschlaeger | H04M 11/10 |
| | | | 379/85 |
| 2008/0201143 A1* | 8/2008 | Olligschlaeger | G06F 16/254 |
| | | | 704/235 |
| 2008/0201158 A1 | 8/2008 | Johnson et al. | |
| 2008/0260133 A1 | 10/2008 | Hodge et al. | |
| 2008/0300878 A1 | 12/2008 | Bennett | |
| 2010/0177881 A1 | 7/2010 | Hodge | |
| 2010/0202595 A1 | 8/2010 | Hodge et al. | |
| 2010/0299761 A1 | 11/2010 | Shapiro | |
| 2011/0055256 A1 | 3/2011 | Phillips et al. | |
| 2011/0244440 A1 | 10/2011 | Saxon et al. | |
| 2011/0279228 A1 | 11/2011 | Kumar et al. | |
| 2012/0262271 A1 | 10/2012 | Torgersrud et al. | |
| 2013/0104246 A1 | 4/2013 | Bear et al. | |
| 2013/0124192 A1 | 5/2013 | Lindmark et al. | |
| 2013/0179949 A1 | 7/2013 | Shapiro | |
| 2014/0247926 A1 | 9/2014 | Gainsboro et al. | |
| 2014/0273929 A1 | 9/2014 | Torgersrud | |
| 2014/0287715 A1 | 9/2014 | Hodge et al. | |
| 2014/0313275 A1 | 10/2014 | Gupta et al. | |
| 2014/0334610 A1 | 11/2014 | Hangsleben | |
| 2015/0206417 A1 | 7/2015 | Bush | |
| 2015/0215254 A1 | 7/2015 | Bennett | |
| 2015/0221151 A1 | 8/2015 | Bacco et al. | |
| 2015/0281431 A1 | 10/2015 | Gainsboro et al. | |
| 2015/0281433 A1* | 10/2015 | Gainsboro | H04M 3/42221 |
| | | | 379/88.01 |
| 2016/0191484 A1 | 6/2016 | Gongaware | |
| 2016/0224538 A1 | 8/2016 | Chandrasekar et al. | |
| 2016/0239932 A1 | 8/2016 | Sidler et al. | |
| 2016/0301728 A1 | 10/2016 | Keiser et al. | |
| 2016/0371756 A1 | 12/2016 | Yokel et al. | |
| 2016/0373909 A1 | 12/2016 | Rasmussen et al. | |
| 2017/0270627 A1 | 9/2017 | Hodge | |
| 2017/0295212 A1 | 10/2017 | Hodge | |

FOREIGN PATENT DOCUMENTS

| | | |
|---|---|---|
| GB | 2075313 | 11/1981 |
| JP | 59225626 | 12/1984 |
| JP | 60010821 | 1/1985 |
| JP | 61135239 | 6/1986 |
| JP | 3065826 | 3/1991 |
| WO | WO 96/14703 A1 | 11/1995 |
| WO | WO 98/13993 A1 | 4/1998 |
| WO | WO 2001/074042 A2 | 10/2001 |
| WO | WO 2016/028864 A1 | 2/2016 |

OTHER PUBLICATIONS

"Cisco IAD2420 Series Integrated Access Devices Software Configuration Guide—Initial Configuration," Cisco Systems, accessed Sep. 23, 2014, accessible at http://www.cisco.com/en/US/docs/routers/access/2400/2420/software/configuration/guide/init_cf.html; 5 pages.

"Hong Kong: Prison Conditions in 1997," Human Rights Watch, Mar. 1, 1997, C905, available at http://www.refworld.org/docid/3ae6a7d014.html, accessed May 29, 2014; 48 pages.

"PacketCableTM 1.0 Architecture Framework Technical Report", PKT-TR-ARCH-V01-001201 (Cable Television Laboratories, Inc. 1999).

"PacketCable™ Audio/Video Codecs Specification," Cable Television Laboratories, Inc., Ser. No. PKT-SP-CODEC-I05-040113 (2004).

"Service-Observing Arrangements Using Key Equipment for Telephone Company Business Offices, Description and Use," Pac. Tel. & Tel. Co., Bell System Practices, Station Operations Manual, Section C71.090. Issue A, 1-1-57-N, 1957; 8 pages.

"SIP and IPLinkTM in the Next Generation Network: An Overview," Intel, 2001; 6 pages.

"The AutoEDMS Document Management and Workflow System: An Overview of Key Features, Functions and Capabilities," ACS Software, May 2003; 32 pages.

"Voice Over Packet in Next Generation Networks: An Architectural Framework," Bellcore, Special Report SR-4717, Issue 1, Jan. 1999; 288 pages.

"Cool Edit Pro, Version 1.2 User Guide," Syntrillium Software Corporation, 1998; 226 pages.

"Criminal Calls: A Review of the Bureau of Prisons' Management of Inmate Telephone Privileges," U.S. Department of Justice, Office of the Inspector General, Aug. 1999; 166 pages.

"Global Call API for Linux and Windows Operating Systems," Intel Dialogic Library Reference, Dec. 2005; 484 pages.

"The NIST Year 2002 Speaker Recognition Evaluation Plan," NIST, Feb. 27, 2002, accessible at http://www.itl.nist.gov/iad/mig/tests/spk/2002/2002-spkrecevalplan-v60.pdf; 9 pages.

Aggarwal, et al., "An Environment for Studying Switching System Software Architecture," IEEE, Global Telecommunications Conference, 1988; 7 pages.

Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.

Audacity Team, "About Audacity," World Wide Web, 2014, accessible at http://wiki.audacity.team.org/wiki/About_Audacity; 3 pages.

Beek et al., "An Assessment of the Technology of Automatic Speech Recognition for Military Applications," IEEE Trans. Acoustics, Speech, and Signal Processing, vol. ASSP-25, No. 4, 1977; pp. 310-322.

(56) References Cited

OTHER PUBLICATIONS

Beigi, et al., "A Hierarchical Approach to Large-Scale Speaker Recognition," EuroSpeech 1999, Sep. 1999, vol. 5; pp. 2203-2206.
Beigi, et al., "IBM Model-Based and Frame-By-Frame Speaker-Recognition," Speaker Recognition and its Commercial and Forensic Applications, Apr. 1998; pp. 1-4.
Beigi, H., "Challenges of Large-Scale Speaker Recognition," 3rd European Cooperation in the Field of Scientific and Technical Research Conference, Nov. 4, 2005; 33 pages.
Beigi, H., "Decision Theory," Fundamentals of Speaker Recognition, Ch. 9, Springer, US 2011; pp. 313-339.
Bender, et al., "Techniques For Data Hiding," IBM Systems Journal, vol. 35, Nos. 3&4, 1996; 24 pages.
Boersma, et al., "Praat: Doing Phonetics by computer," World Wide Web, 2015, accessible at http://www.fon.hum.uva.nl/praat; 2 pages.
Bolton, et al., "Statistical Fraud Detection: A Review," Statistical Science, vol. 17, No. 3 (2002), pp. 235-255.
Boney, L., et al., "Digital Watermarks for Audio Signals" Proceedings of EUSIPC0-96, Eighth European Signal processing Conference, Trieste, Italy, 10-13 (1996).
Boney, L., et al., "Digital Watermarks for Audio Signals" Proceedings of the International Conference on Multimedia Computing Systems, p. 473-480, IEEE Computer Society Press, United States (1996).
Bur Goode, Voice Over Internet Protocol (VoIP), Proceedings of the IEEE, vol. 90, No. 9, Sep. 2002; pp. 1495-1517.
Carey, et al., "User Validation for Mobile Telephones," International Conference on Acoustics, Speech, and Signal Processing (ICASSP), vol. 2, Jun. 2000, pp. 1093-1096.
Chau, et al., "Building an Infrastructure for Law Enforcement Information Sharing and Collaboration: Design Issues and Challenges," National Conference on Digital Government, 2001; 6 pages.
Chaudhari, et al., "Transformation enhanced multi-grained modeling for text-independent speaker recognition," International Conference on Spoken Language Processing, 2000, pp. 298-301.
Christel, et al., "Interactive Maps for a Digital Video Library," IEEE Special Edition on Multimedia Computing, Jan.-Mar. 2000, IEEE, United States; pp. 60-67.
Clavel, et al., "Events Detection for an Audio-Based Surveillance System," IEEE International Conference on Multimedia and Expo (ICME2005), Jul. 6-8, 2005, pp. 1306-1309.
Coden, et al., "Speech Transcript Analysis for Automatic Search," Proceedings of the 34th Hawaii International Conference on System Sciences, IEEE, 2001; 9 pages.
Coherent Announces Industry's First Remote Management System for Echo Canceller, Business Wire, Mar. 3, 1997; 3 pages.
Corbato, et al., "Introduction and Overview of the MULTICS System," Proceedings—Fall Joint Computer Conference, 1965; 12 pages.
Cox, et al.; "Secure Spread Spectrum Watermarking for Multimedia," NEC Research Institute, Technical Report 95-10, Dec. 1997; 34 pages.
Digital Copy of "Bellcore Notes on the Networks," Bellcore, Special Report SR-2275, Issue 3, Dec. 1997.
Doddington, G., "Speaker Recognition based on Idiolectal Differences between Speakers," 7th European Conference on Speech Communication and Technology, Sep. 3-7, 2001; 4 pages.
Dunn, et al., "Approaches to speaker detection and tracking in conversational speech," Digital Signal Processing, vol. 10, 2000; pp. 92-112.
Dye, Charles, "Oracle Distributed Systems," O'Reilly Media, Inc., Apr. 1, 1999; 29 pages.
Fischer, Alan D., "COPLINK nabs criminals faster," Arizona Daily Star, Jan. 7, 2001; 5 pages.
Fleischman, E., "Advanced Streaming Format (ASF) Specification," Microsoft Corporation, Jan. 9, 1998; 78 pages.
Fox, B., "The First Amendment Rights of Prisoners," 63 J. Crim. L. Criminology & Police Sci. 162, 1972; 24 pages.
Frankel, E., Audioconferencing Options (Teleconferencing Units, Conference Bridges and Service Bureaus), Teleconnect, vol. 4, No. 5, p. 131(3), May 1996; 6 pages.
Furui, et al., "Experimental studies in a new automatic speaker verification system using telephone speech," Acoustics, Speech, and Signal Processing, IEEE International Conference on ICASSP '80, vol. 5, Apr. 1980, pp. 1060-1062.
Furui, S., "50 Years of Progress in Speech and Speaker Recognition Research," ECTI Transactions on Computer and Information Technology, vol. 1, No. 2, Nov. 2005, pp. 64-74.
Hansen, et al., "Speaker recognition using phoneme-specific gmms," The Speaker and Language Recognition Workshop, May-Jun. 2004; 6 pages.
Hauck, et al., "Coplink: a Case of Intelligent Analysis and Knowledge Management," University of Arizona, 1999; 20 pages.
Hewett, et al., Signaling System No. 7 (SS7/C7): Protocol, Architecture, and Services (Networking Technology), Cisco Press, Jun. 2005; 8 pages.
I2 Investigative Analysis Software; "Chart Reader", URL: http://www.i2.eo.uk/Products/Chart Reader. Jun. 13, 2005.
I2 Investigative Analysis Software; "i2 TextChart—Text Visualized", URL: http://www.i2.co.uk/Products/i2TextChart/. Jun. 13, 2005.
I2 Investigative Analysis Software; "iBase-Information Captured", URL: http://www.i2.co.uk/Products/iBase/. Jun. 13, 2005.
I2 Investigative Analysis Software; "iBridge", URL: http://www.i2.eo.uk/Products/iBridge/. Jun. 13, 2005.
I2 Investigative Analysis Software; "Pattern Tracer", URL: http://www.i2.co.uk/Products/Pattern Tracer/. Jun. 13, 2005.
I2 Investigative Analysis Software; "Prisons", URL: http://www.i2.co.uk/Solutions/Prisons/default.aso. Jun. 13, 2005.
I2 Investigative Analysis Software; "Setting International Standards for Investigative Analysis", URL: htto://www.i2.co.uk/Products/index.htm. Jun. 13, 2005.
IMAGIS Technologies, Inc. "Computer Arrest and Booking System", [retrieved from http://www.imagistechnologies.com/Product/CABS.htm] (Nov. 5, 2002) 5 pages.
IMAGIS Technologies, Inc. "Integrated Justice System—Web-based Image and Data Sharing" [retrieved from http://www.imagistechnologies.com/Product/IJISFramework.htm>] (Nov. 5, 2002) 4 pages.
Inmate Telephone Services: Large Business: Voice. Oct. 2, 2001; 3 pages.
Intel® NetStructure High-Density Station Interface (HDSI) Boards Archived Webpage, Intel Corporation, 2003; 2 pages.
International Search Report and Written Opinion directed to related International Application No. PCT/US2017/022169, dated May 29, 2017; 57 pages.
International Search Report for International Application No. PCT/US04/025029, European Patent Office, Netherlands, dated Mar. 14, 2006.
Isobe, et al., "A new cohort normalization using local acoustic information for speaker verification," Proceedings of the IEEE International Conference on Acoustics, Speech, and Signal Processing, vol. 2, Mar. 1999; pp. 841-844.
Juang, et al., "Automatic Speech Recognition—A Brief History of the Technology Development," Oct. 8, 2014; 24 pages.
Kinnunen, et al., "Real-Time Speaker Identification and Verification," IEEE Transactions on Audio, Speech, and Language Processing, vol. 14, No. 1, Jan. 2006, pp. 277-288.
Knox, "The Problem of Gangs and Security Threat Groups (STG's) in American Prisons Today: Recent Research Findings From the 2004 Prison Gang Survey," National Gang Crime Research Center, 2005; 67 pages.
Kozamernik, F., "Media Streaming over the Internet—an overview of delivery technologies," EBU Technical Review, Oct. 2002; 15 pages.
Lane, et al., Language Model Switching Based on Topic Detection for Dialog Speech Recognition, Proceedings of the IEEE-ICASSP, vol. 1, 2003, IEEE; pp. 616-619.
Maes, et al., "Conversational speech biometrics," E-Commerce Agents, Marketplace Solutions, Security Issues, and Supply and Demand, Springer-Verlang, London, UK, 2001, pp. 166-179.

(56) References Cited

OTHER PUBLICATIONS

Maes, et al., "Open SESAME! Speech, Password or Key to Secure Your Door?," Asian Conference on Computer Vision, Jan. 1998; pp. 1-3.
Matsui, et al., "Concatenated Phoneme Models for Text-Variable Speaker Recognition," International Conference on Acoustics, Speech, and Signal Processing (ICASSP), vol. 2, Apr. 1993; pp. 391-394.
McCollum, "Federal Prisoner Health Care Copayment Act of 2000," House of Representatives Report 106-851, 106th Congress 2d Session, Sep. 14, 2000; 22 pages.
Microsoft White Paper: "Integrated Justice Information Systems", retrieved from Microsoft Justice & Public Safety Solutions (Nov. 5, 2002) [http://jps.directtaps.net_vtibin/owssvr.dll?Using=Default%2ehtm]; 22 pages.
Moattar, et al., "Speech Overlap Detection using Spectral Features and its Application in Speech Indexing," 2nd International Conference on Information & Communication Technologies, 2006; pp. 1270-1274.
National Alliance of Gang Investigators Associations, 2005 National Gang Threat Assessment, 2005, Bureau of Justice Assistance, Office of Justice Programs, U.S. Department of Justice; 73 pages.
National Major Gang Taskforce, "A Study of Gangs and Security Threat Groups in America's Adult Prisons and Jails," 2002; 38 pages.
Navratil, et al., "A Speech Biometrics System With MultiGrained Speaker Modeling," 2000; 5 pages.
Navratil, et al., "Phonetic speaker recognition using maximum-likelihood binary-decision tree models," Proceedings of the IEEE International Conference on Acoustics, Speech, and Signal Processing, Apr. 6-10, 2003; 4 pages.
O'Harrow, R. "U.S. Backs Florida's New Counterterrorism Database; 'Matrix' Offers Law Agencies Faster Access to Americans' Personal Records"; The Washington Post. Washington, D.C., Aug. 6, 2003; p. A 01.
O'Harrow, R., "Database will make tracking suspected terrorists easier", The Dallas Morning News. Dallas, TX, Aug. 6, 2003; p. 7A.
Olligschlaeger, A. M., "Criminal Intelligence Databases and Applications," in Marilyn B. Peterson, Bob Morehouse, and Richard Wright, Intelligence 2000: Revising the Basic Elements—A Guide for Intelligence Professionals, Mar. 30, 2000 a joint publication of IALEIA and LEIU; 53 pages.
Osifchin, N., "A Telecommunications Buildings/Power Infrastructure in a New Era of Public Networking," IEEE 2000; 7 pages.
Pages from http://www.corp.att.com/history, archived by web.archive.org on Nov. 4, 2013.
Pelecanos, J. "Conversational biometrics," in Biometric Consortium Meeting, Baltimore, MD, Sep. 2006, accessible at http://www.biometrics.org/bc2006/presentations/Thu_Sep_21/Session_I/Pelecanos_Conversational_Biometrics.pdf; 14 pages.
Pollack, et al., "On the Identification of Speakers by Voice," The Journal of the Acoustical Society of America, vol. 26, No. 3, May 1954; 4 pages.
Prosecution History of International Patent Application No. PCT/US99/09493 by Brown et al., filed Apr. 29, 1999.
Prosecution History of U.S. Appl. No. 11/182,625, filed Jul. 15, 2005.
Rey. R.F., ed., "Engineering and Operations in the Bell System," 2nd Edition, AT&T Bell Laboratories: Murray Hill, NJ, 1983; 884 pages.
Reynolds, D., "Automatic Speaker Recognition Using Gaussian Mixture Speaker Models," The Lincoln Laboratory Journal, vol. 8, No. 2, 1995; pp. 173-192.
Rosenberg, et al., "SIP: Session Initial Protocol," Network Working Group, Standard Track, Jun. 2002; 269 pages.
Rosenberg, et al., "The Use of Cohort Normalized Scores for Speaker Verification," Speech Research Department, AT&T Bell Laboratories, 2nd International Conference on Spoken Language Processing, Oct. 12-16, 1992; 4 pages.
Ross, et al., "Multimodal Biometrics: An Overview," Proc. of 12th European Signal Processing Conference (EUSIPCO), Sep. 2004; pp. 1221-1224.
Science Dynamics, BubbleLINK Software Architecture, 2003; 10 pages.
Science Dynamics, Commander Call Control System, Rev. 1.04, 2002; 16 pages.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics. SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_main.htm (archived by web.archive.org on Oct. 12, 2000).
Shearme, et al., "An Experiment Concerning the Recognition of Voices," Language and Speech, vol. 2, No. 3, Jul./Sep. 1959; 10 pages.
Silberg, L., Digital on Call, HFN The Weekly Newspaper for the Home Furnishing Network, Mar. 17, 1997; 4 pages.
Silberschatz, et al., Operating System Concepts, Third Edition, Addison-Wesley: Reading, MA, Sep. 1991; 700 pages.
Simmons, R., "Why 2007 is Not Like 1984: A Broader Perspective on Technology's Effect on Privacy and Fourth Amendment Jurisprudence," J. Crim. L. & Criminology vol. 97, No. 2, Winter 2007; 39 pages.
Smith, M., "Corrections Turns Over a New LEAF: Correctional Agencies Receive Assistance From the Law Enforcement Analysis Facility," Corrections Today, Oct. 1, 2001; 4 pages.
Specification of U.S. Appl. No. 10/720,848, "Information Management and Movement System and Method," to Viola, et al., filed Nov. 24, 2003. (Abandoned).
State of North Carolina Department of Correction RFP #ITS-000938A, issued May 25, 2004; 8 pages.
Statement for the Record of John S. Pistole, Assistant Director, Counterterrorism Division, Federal Bureau of Investigation, Before the Senate Judiciary Committee, Subcommittee on Terrorism, Technology, and Homeland Security, Oct. 14, 2003.
Sundstrom, K., "Voice over IP: An Engineering Analysis," Master's Thesis, Department of Electrical and Computer Engineering, University of Manitoba, Sep. 1999; 140 pages.
Supplementary European Search Report for EP Application No. EP 04 80 9530, Munich, Germany, completed on Mar. 25, 2009.
Tanenbaum, A., *Modern Operating Systems*, Third Edition, Peason Prentice Hall: London, 2009; 552 pages.
Tirkel, A., et al.; "Image Watermarking—A Spread Spectrum Application," Sep. 22-25, 1996; 7 pages.
U.S. Appl. No. 60/607,447, "IP-based telephony system and method," to Apple, et al., filed Sep. 3, 2004.
Viswanathan, et al., "Multimedia Document Retrieval using Speech and Speaker Recognition," International Journal on Document Analysis and Recognition, Jun. 2000, vol. 2; pp. 1-24.
Walden, R., "Performance Trends for Analog-to-Digital Converters," IEEE Communications Magazine, Feb. 1999.
Weinstein, C., MIT, The Experimental Integrated Switched Network—A System-Level Network Test Facility, IEEE 1983; 8 pages.
Wilkinson, Reginald A., "Visiting in Prison," Prison and Jail Administration's Practices and Theory, 1999; 7 pages.
Winterdyk et al., "Managing Prison Gangs," Journal of Criminal Justice, vol. 38, 2010; pp. 730-736.
Zajic, et al., "A Cohort Methods for Score Normalization in Speaker Verification System, Acceleration of On-Line Cohort Methods," Proceedings of the 12th International Conference "Speech and Computer," Oct. 15-18, 2007; 6 pages.

(56) References Cited

OTHER PUBLICATIONS

International Search Report and Written Opinion directed to International Application No. PCT/US2017/026570, dated May 8, 2017; 7 pages.

* cited by examiner

DETECTION AND PREVENTION OF INMATE TO INMATE MESSAGE RELAY

CROSS-REFERENCE TO RELATED APPLICATIONS

This application is a continuation of U.S. patent application Ser. No. 15/071,082, filed on Mar. 15, 2016, which is incorporated by reference herein in its entirety.

BACKGROUND

Field

The disclosure relates to a system and method of detecting and preventing illegal inmate-to-inmate communications in a controlled environment facility.

Related Art

In current prison facilities, inmates are generally permitted to communicate, using the prison's communication system, with a wide variety of individuals both inside and outside of the prison facility. As such, inmates of a particular facility may be capable of communicating with other inmates, either in their own facility, or in other facilities. Even if direct contact is prohibited, such communication can still occur via an intermediary.

There are monitoring systems and methods currently implemented in controlled environment facilities. However, the ability of inmates to communicate with other inmates presents a number of challenges that are unique to a controlled environment facility and that are not sufficiently hampered by current monitoring and control systems.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1A:
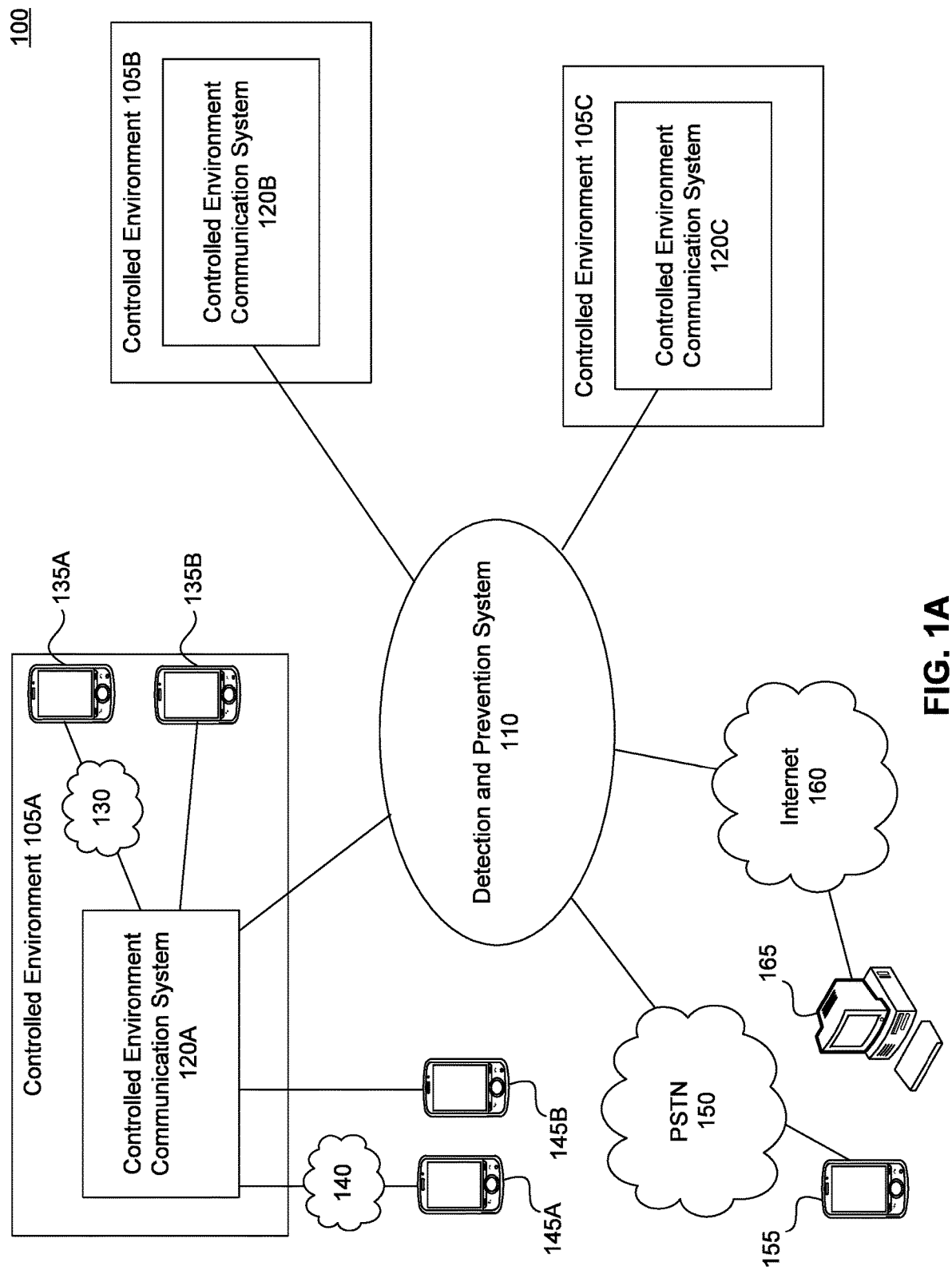
FIG. 1A illustrates a centralized detection and prevention system connected to several controlled environment facilities, according to an embodiment of the invention.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

Embodiments may be implemented in hardware (e.g., circuits), firmware, computer instructions, or any combination thereof. Embodiments may be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, or other hardware devices Further, firmware, routines, computer instructions may be described herein as performing certain actions. However, it should be appreciated that such descriptions are merely for convenience and that such actions in fact results from computing devices, processors, controllers, or other devices executing the firmware, routines, instructions, etc. Further, any of the implementation variations may be carried out by a general purpose computer, as described below.

For purposes of this discussion, the term "module" shall be understood to include at least one of hardware (such as one or more circuit, microchip, processor, or device, or any combination thereof), firmware, computer instructions, and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many different communications protocols.

American correctional facilities house millions of individuals in controlled environments all over the country. An ongoing problem for such correctional facilities is the ability for inmates to communicate with other inmates in order to arrange illegal activities. Such illegal activities might include a hit (e.g., orchestrated killing) on a person that is incarcerated or perhaps is part of the general public. Another example of such illegal activities might be to arrange and organize a riot. The ability of inmates to plan and coordinate these events with other inmates over the prison communication system is a serious security concern with potentially fatal consequences.

Generally, correctional facilities restrict phone access by designating the time and place of calls permitted to the inmates. Correctional facilities also restrict phone access for inmates by permitting communication with only preapproved individuals or prohibiting inmates from dialing specific numbers. In extreme situations, correctional facilities may terminate all prison communication services for a certain period of time, particularly during a riot or other emergency situation.

Most communications made by inmates are closely monitored by correctional facilities. However, regardless of the measures taken by correctional facilities, inmates repeatedly attempt to avoid detection of suspicious communication regarding illegal activities by relaying messages to other inmates or third parties outside of the correctional facilities. For example, in some instances, an inmate may be permitted to directly contact an inmate within their own facility, or within a separate facility. This provides a direct line of communication to facilitate the coordination of criminal acts. In other instances, an inmate may call an outside third party and instruct the third party to contact another inmate in order to relay certain information. In this manner, the inmate is able to skirt the restrictions in order to effectively "communicate" with the other inmate. Thus, even without the direct line of communication, coordination can still occur via the use of the intermediary.

As illustrated by these examples, there are many unique concerns associated with monitoring the communications by inmates of a controlled facility. To further complicate matters, certain facilities may be outfitted to allow inmates to carry personal inmate devices (PIDs) and use their own personal devices, in the form of tablet computers, smartphones, etc. for personal calls, digital content streaming, among other uses.

With these concerns in mind, it is preferable to implement a system and/or method of detecting and preventing inmate-to-inmate message relays. With this objective in mind, the following description is provided for a system and method which monitors separate inmate communications for similar phrases. These similar phrases may be overlapping in real time, for example as part of a conference call, or can occur at separate times in separate communications. Communications are scored based on their similarity, and the resulting score is compared to a threshold. If the score is above the threshold, any number of preventative measures are taken, such as flagging the communications and alerting authorities. Additional measures may include identifying whether the communications contain illegal matter and then disconnecting the communications, restricting future communications, and/or preparing countermeasures to thwart the illegal activity.

Exemplary Centralized Detection and Prevention System

FIG. 1A illustrates an exemplary centralized detection and prevention system environment 100. In the environment 100, a detection and prevention system 110 is a centralized system that is connected to one or more controlled environments 105A-C through each respective controlled environment communication system 120A-C. In an embodiment, the controlled environment communication systems 120A-C control the majority of communications coming into or leaving the respective facilities, particularly those by or for inmates within the facility. The detection and prevention system 110 may be connected through wired and/or wireless connections to the controlled environment communications systems 120A-C. In an embodiment, so as to facilitate communication with outsider third parties, the detection and prevention system 110 is connected to one or both of the PSTN 150 and the Internet 160. Each of the PSTN 150 and the Internet 160 may be connected to various communications devices, such as devices 155 and 165.

In an embodiment, the detection and prevention system 110 performs a variety of functions with respect to the communications, such as monitoring for key words and/or phrases indicative of a rules violation, recording conversations for future review by an investigator or other authorized person, as well as call control, such as disconnecting the call in response to the detection of a rules violation, alerting an official of a rules violation, etc. The function of the detection and prevention system 110 may vary depending on the time sensitivity of communications between outsider parties and inmates in the controlled environments 120A-C. For time sensitive communications, such as live telephone calls, the detection and prevention system 110 is transparent to the communication and monitors the ongoing communication until the detection and prevention system 110 detects a rule violation or until the communication ends. For non-time sensitive communications, such as emails and texts, the detection and prevention system 110 may act as a communication interceptor, withholding the communication while it is being analyzed for a rules violation before releasing the communication (e.g., forwarding it) to the intended recipient.

In an embodiment, the controlled environment communication system 120A provides a local wireless network 130 for providing wireless communication connectivity to wireless communication devices 135A. Wireless communication devices 135A may include electronic wireless communication devices such as smart phones, tablet computers, PIDs, game consoles, and laptops, among others. In an embodiment, wired communication devices 135B are also connected to the controlled environment communication system 120A. Wired communication devices 135B may include telephones, workstations, computers, in-pod kiosks, game consoles, and fax machines, among others.

In an embodiment, communication devices outside of the controlled environment 145A-B communicate with devices within the controlled environment 105A. Wireless communication devices 145A may be connected to the controlled environment communication system 120A through a wireless network 140. In an embodiment, wired communication devices 145B are connected directly to the controlled environment communication system 120A without an intervening network.

Exemplary Localized Detection and Prevention System

Figure 1B:
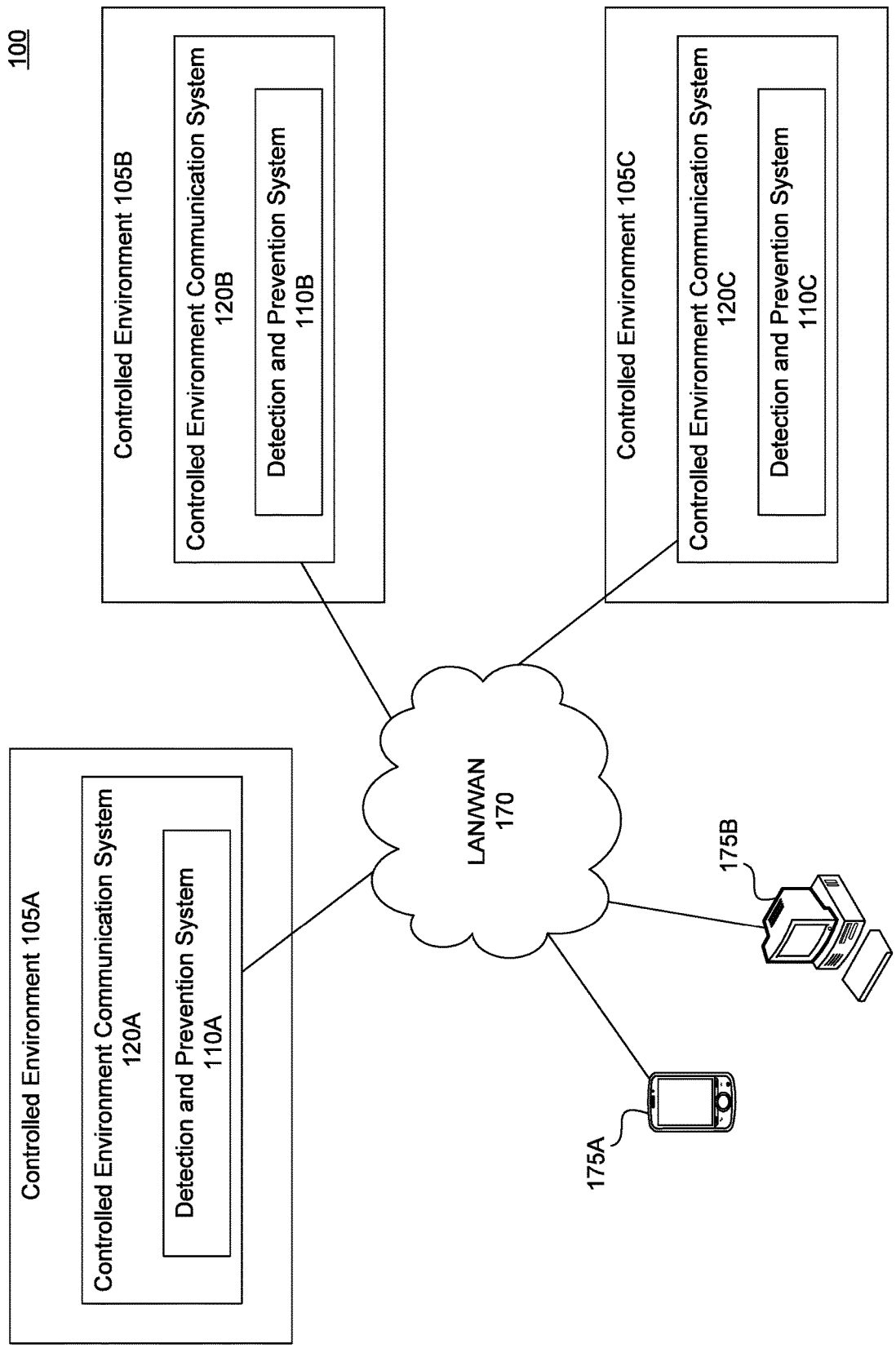
FIG. 1B illustrates localized detection and prevention systems supporting several controlled environment facilities, according to an embodiment of the invention.

FIG. 1B illustrates an exemplary localized detection and prevention system environment 100. In the environment 100, detection and prevention systems 110A-C are localized systems that are located in one or more controlled environments 105A-C. Most communications flowing in and out of controlled environments 105A-C are controlled by the controlled environment communication systems 120A-C. Most communications flowing through the controlled environment communication systems 120A-C are monitored by the localized detection and prevention systems 110A-C. The detection and prevention systems 110A-C may be connected through wired and/or wireless connection to the controlled environment communications systems 120A-C. In an embodiment, so as to facilitate communication with other controlled environments 105A-C and outsider third parties, the detection and prevention systems 110A-C are connected to one or both of the LAN and WAN 170 networks, such as the PSTN and the Internet, among others. Each of the WAN and LAN 170 networks may provide connection for various communications devices 175A-B.

Exemplary Detection and Prevention System

Figure 2:
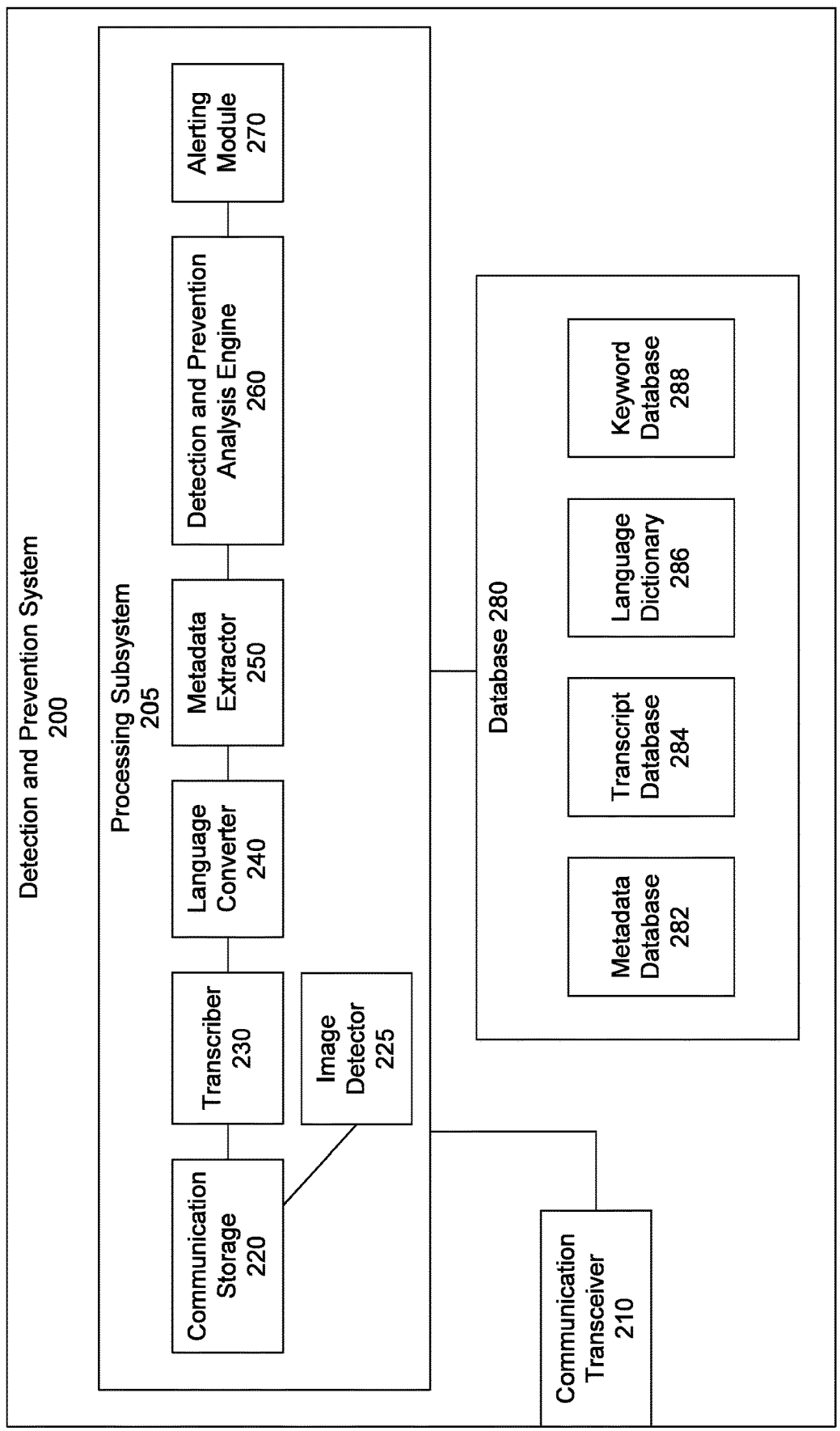
FIG. 2 illustrates a block diagram of a detection and prevention system, according to an embodiment of the invention.

FIG. 2 illustrates a block diagram of a detection and prevention system 200, according to an embodiment of the invention. The detection and prevention system 200 includes at least a processing subsystem 205, a communication transceiver 210, and a database 280, and may represent an exemplary embodiment of any of the detection and prevention systems 110 illustrated in FIGS. 1A and 1B. The processing subsystem 205 includes a communication storage 220, an image detector 225, a transcriber 230, a language converter 240, a metadata extractor 250, a detection and prevention analysis engine 260, and an alerting module 270. The database 280 includes a metadata database 282, a transcript database 284, language dictionary 286, and a keyword database 288.

The communication transceiver 210 detects communications sent to/from the controlled environment. The communications may be time sensitive, such as phone calls or video conferences, in which case the communication transceiver 210 detects real time communications between inmates and outsider third parties. Examples of real time communications include voice calls, video conference calls, video visitation sessions, video hand messaging sessions, multi-player game sessions, among others. In another embodiment, the communication transceiver 210 detects non time sensitive communications such as, voice messages, email messages, text messages, among others. The communication transceiver 210 is connected to the processing subsystem 205 in order to further analyze the communication.

The communication storage 220 receives and stores communications detected by the communication transceiver 210, according to an embodiment of the invention. The communications are stored in the appropriate file format in which the communications have been detected by the communication transceiver 210. The communication storage 220 stores the detected communications in the appropriate file format according to the type of communication. Audio communications are stored in various uncompressed and compressed audio file formats. Exemplary audio file formats include, WAV, AIFF, FLAC, WavPack, MP3, among others. In an embodiment, communications detected by the communication transceiver 210 may be in the form of audio, video, text or other suitable formats depending on the type of communication received. Video communications are stored in various video file formats such as WMV, AVI, Quicktime, among others. Text communications are stored in various text file formats such as TXT, CSV, DOC, among others.

The image detector 225 receives and analyzes video files stored in the communication storage 220, according to an embodiment of the invention. In order to determine whether two or more inmates are present on the same video communication, the image detector 225 captures images from the video communication and utilizes well-known 2D and 3D image recognition algorithms to determine the images of the participants. The image detector 225 compares the determined images of the video communication participants with images of inmates at the controlled environment. Upon a determination by the image detector 225 that there are two or more inmates present on the same video communication, the image detector 225 transmits a notification signal regarding the violating communication to the alerting module 270. In an embodiment, the image detector 225 can determine the presence of the same inmate on two or more simultaneous video communications made to the same phone number, IP address, or MAC address. In other words, the image detector 225 is capable of detecting a violating video communication between two or more inmates connected by each inmate separately calling the same phone number, IP address, or MAC address at the same time.

The transcriber 230 receives and transcribes audio files stored in the communication storage 220, according to an embodiment of the invention. In order to monitor the communications for rule violations, the transcriber 230 directly transcribes the audio file into a text file. The resulting text file contains the transcript of the detected communication. In an embodiment, the transcriber 230 receives and transcribes audio associated with video files stored in the communication storage 220.

The transcriber 230 performs analysis of the audio file for the transcription and annotation of speech signals by comparing the speech signals with known sound waveforms and speech signature frequencies stored in the language dictionary 286. The language dictionary 286 contains sound waveforms and speech signature frequencies for different languages. In an embodiment, the transcriber 286 can analyze an audio file containing different languages by comparing it with the sound waveforms and speech signature frequencies for the corresponding language contained in the language dictionary 286. In another embodiment, the transcriber 230 conducts voice analysis of the audio file and recognizes phonemes and/or intonations and identifies the speech as associated with the different speakers using voice analysis techniques. In other words, the transcriber can assign speech segments to different speakers in order to generate a dialog transcript of the actual conversation. The transcriber 230 lists and names the different participants in the audio file and labels the sentences in the transcript in order to indicate which speaker is communicating in that particular portion of the transcript. The transcriber 230 transcribes events that occur during the conversation such as long pauses, extra dialed digits, progress tones, among others into the transcript. The transcriber 230 can conduct phonetic transcription of the audio based on a phoneme chart stored in the language dictionary 286.

The language converter 240 receives the communications from the transcriber 230 and the communication storage 220 and converts the communications into a standard language, according to an embodiment of the invention. As mentioned above, the communications may be conducted in different languages. The conversion into a standard language facilitates a more efficient and universal method of monitoring the communications to detect rule violations. In an embodiment, the language converter 240 converts the communications into English. The language dictionary contains dictionaries for many different languages. When the language converter 240 receives a communication containing languages other than English, the language converter 240 searches the language dictionary 286 for the corresponding words and phrases in English and converts the communication accordingly. Using well-known grammatical algorithms, the language converter 240 is able to perform the language conversion without significant grammatical errors in the converted text. The conversion results in a text file containing a transcript of the detected communication in a standard language. In an embodiment, the language converter 240 and the transcriber work as part of a combined system to simultaneously perform language conversion and transcription.

The metadata extractor 250 receives the transcribed and/or converted communication from the language converter 240 and extracts metadata from the communication, according to an embodiment of the invention. The metadata summarizes basic information about the communication. For example, the basic information about the communication may include the names of the people communicating, the phone numbers or email accounts, and the date and time of the communication, among others. The metadata extractor 250 transmits and saves the metadata in the metadata database 282 and the text file containing the corresponding communication in the transcript database 284.

The detection and prevention analysis engine 260 receives the communication from the metadata extractor 250 and analyzes the communication for illegal or suspicious contents, according to an embodiment of the invention. The detection and prevention analysis engine 260 analyzes the communication and compares it to past communications to detect rule violations. The detection and prevention analysis engine 260 will be described in detail in the following FIG. 3.

Upon the determination of a rule violation, the detection and prevention analysis engine 260 transmits a notification signal regarding the violating communication to the alerting module 270. Subsequently, the alerting module 270 alerts responsible supervising personnel at the controlled environments 105A-C. In an embodiment, the alerting module 270 may disconnect a real time communication upon receipt of a notification signal from the detection and prevention analysis engine 260. The alerting module may withhold the transmission of the non time sensitive communication until the supervising personnel reviews and "OKs" the communication. In some embodiments, the alerting module transmits the converted transcript of the violating communication along with the notification signal.

The metadata database 282 stores the metadata extracted from most communications detected by the detection and prevention system 200, according to an embodiment of the invention. The metadata in the metadata database 282 contains basic information about the corresponding communication stored in the transcript database. Basic information about a communication may include the names of the people communicating, the numbers and accounts used, the time and date of the communication, among others. The metadata database 282 helps the detection and prevention system 200 organize the large volume of communications and provides digital identification for each communication detected by the detection and prevention system 200. The metadata database 282 supports archiving and preserving the communications detected by the system. The metadata database 282 assists with searching for previous communications in the transcript database 284 by accommodating an initial search within the metadata database 282 for past communications based on basic information such as the name of the inmates or the phone numbers used in the communication. The initial search through the metadata database 282 allows the system to narrow the search to identified past communications in the transcript database 284.

The transcript database 284 contains the communications detected by the detection and prevention system 200 in a text file format, according to an embodiment of the invention. The communications in the transcript database 284 have mostly been converted to a standard language and have corresponding metadata in the metadata database 282.

The language dictionary 286 includes the language dictionaries of different types of languages. The language dictionary 286 also includes sound waveforms and speech signature frequencies for each respective language. For example, the language dictionary 286 may include vocabulary and phrases in Spanish, Arabic, Chinese, Japanese, Korean, among others. The keyword database 288 includes keywords that are typically used by controlled environments to monitor inmate communications. In an embodiment, the use of a keyword in an inmate communication would be detected by the detection and prevention system 200 and consequently trigger the monitoring of the communication for an extended period of time. For example, keywords may include "kill," "drugs," and "riot" and the detection of a key word in an inmate communication would trigger the extended monitoring of the communication.

Exemplary Detection and Prevention Analysis Engine

Figure 3:
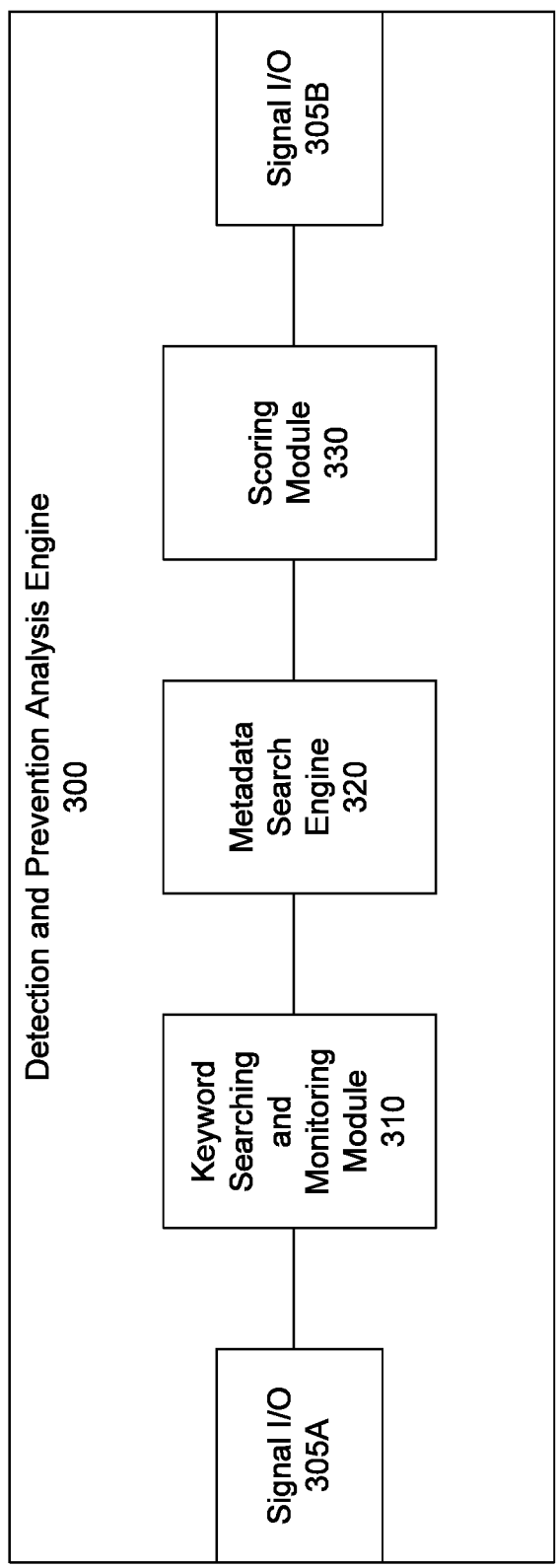
FIG. 3 illustrates a block diagram of a detection and prevention analysis engine, according to an embodiment of the invention.

FIG. 3 illustrates a block diagram of a detection and prevention analysis engine 300, according to an embodiment of the invention. The detection and prevention system includes a signal input/output 305A-B, a keyword searching and monitoring module 310, metadata search engine, and scoring module 330. The detection and prevention analysis engine 300 may represent an exemplary embodiment of the detection and prevention analysis engine 260.

The signal I/O 305A receives and transmits the communications to be analyzed by the detection and prevention analysis engine 300. The keyword searching and monitoring module 310 receives and searches the communication for keywords and/or phrases stored in the keyword database 288, according to an embodiment of the invention. When a keyword is detected, the monitoring function is triggered and the message is monitored for an extended period of time. The monitored communication is received by the scoring module to be compared with relevant past communications stored in the transcript database 284. The keyword searching and monitoring module 310 reads the metadata associated with the communication, which will be used by the metadata to the metadata search engine 320 to conduct a search for past communications containing similar metadata. In another embodiment, the keyword searching and monitoring module 310 searches the received communication for terms and phrases that indicate contact information. Such terms and phrases may include addresses, phone numbers, email addresses, among others. For example, the keyword searching and monitoring module 310 is capable of recognizing a string of spoken numbers that resemble a phone number. Any received communication that contains an address, phone number, email address, or any other means of contacting a different party is assigned a predetermined high score.

The metadata search engine 320 receives the metadata associated with a monitored communication and conducts a search in the metadata database 282 for any overlap in the metadata for past communications, according to an embodiment of the invention. The search of the metadata database 282 identifies the relevant metadata with corresponding communication transcripts stored in the transcript database

284. The metadata search engine 320 receives the corresponding communication transcripts from the transcript database 284. The corresponding communication transcripts are provided to the scoring module 330 to be compared with the monitored communication transmitted by the keyword searching and monitoring module 310.

The scoring module 330 scores the monitored communication transmitted by the keyword searching and monitoring module 310, according to an embodiment of the invention. The scoring module compares the monitored communication with the relevant communication transcripts transmitted by the metadata search engine 320. The scoring module 330 searches and compares similar phrases contained in the monitored communication with the relevant communication transcripts. The scoring module 330 assigns a score to the monitored communication and compares the score with a predetermined threshold. If the score is higher than the threshold, the communication is flagged and a notification signal is sent to the alerting module 260. The scoring module 330 will be described in detail in the following FIG. 4.

Exemplary Scoring Module

Figure 4:
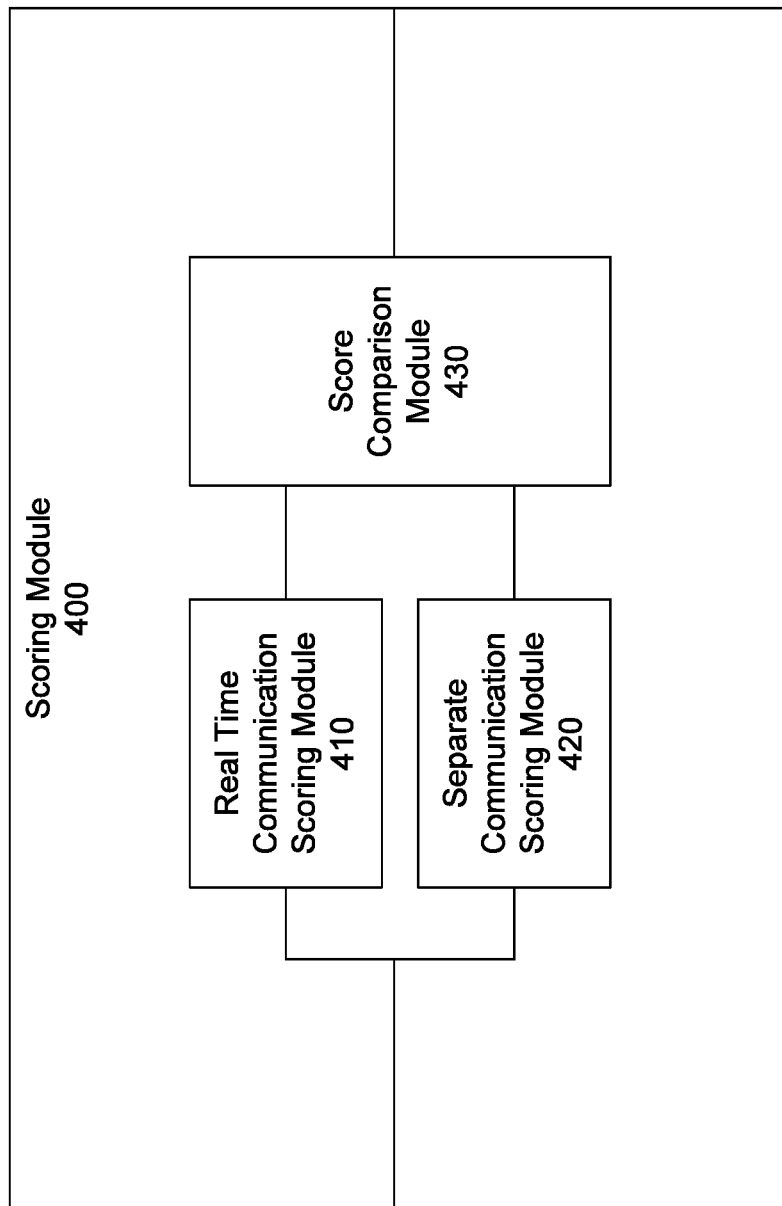
FIG. 4 illustrates a block diagram of a scoring module, according to an embodiment of the invention.

FIG. 4 illustrates a block diagram of a scoring module 400, according to an embodiment of the invention. The scoring module includes a real time communication scoring module 410, a separate communication scoring module 420, and a score comparison module 430. The scoring module 400 may represent an exemplary embodiment of the scoring module 330.

The real time communication scoring module 410 scores real time communications by comparing similar phrases and keywords within the real time communications with relevant past communications, according to an embodiment of the invention. The real time communications scoring module 410 receives monitored communications from the keyword searching and monitoring module 310 and determines whether there are any rule violations within the real time communication. An example of a rule violation within a real time communication would be an ongoing conversation containing message relays from one inmate to another. Accordingly, the focus of the real time communication scoring module 410 is to determine the similarities of words being spoken between the participants in a real time communication in relation to a past communication. The real time communication scoring module 410 compares the monitored communication with relevant past communications stored in the transcript database 284 in order to determine the similarities of words between the relevant past communications and the real time communication. The real time communication scoring module 410 calculates and assigns a score to the monitored communication.

In an embodiment, the monitored communication received by the real time communication scoring module 410 is in the form of a language converted transcript. The transcript indicates who is communicating in each specific section of the transcript. The real time communication scoring module 410 distinguishes the different participants in the monitored communication and searches for similarities between the communications of each participant. The real time communication scoring module 410 identifies the same or similar textual content within the transcript and compares the textual content with relevant past communications. The real time communication scoring module 410 calculates a score for the monitored communication by calculating a correlation of between the contents of the monitored communication and relevant past communications. The score for the monitored communication can vary depending on the number of times a similar phrase is used and the significance of the phrase. The score is higher for monitored communications containing a higher correlation and/or a higher frequency of similar phrases used, and the use of a suspicious or illegal keyword. The score is lower for communications containing a lower correlation and/or a lower frequency of similar phrases used, and the use of benign phrases. In another embodiment, the real time communication scoring module 410 accesses the key word database 288 and the score may additionally or alternatively depend on the frequency of key words detected in the real time communication. The score is higher for monitored communications containing a higher frequency of key words.

The separate communication scoring module 420 scores communications that are not in real time, according to an embodiment of the invention. An example of a separate communication includes emails and texts sent between inmates at separate times, among others. The separate communication scoring module 420 focuses on comparing the monitored communication with relevant past communications stored in the transcript database 284 in order to determine the similarities of words between the separate communications. The separate communication scoring module 420 calculates and assigns a score to the monitored communication.

In an embodiment, the separate time communication scoring module 420 receives a monitored communication from the keyword searching and monitoring module 310. The separate time communication scoring module 420 receives past communications related to the monitored communication from the metadata search engine 320. The communications are in the form of a language converted transcript. The separate time communication scoring module 420 identifies the same or similar textual content between the monitored communication and the relevant past communications and calculates a score for the monitored communication based on the comparison. The separate time communication scoring module 420 calculates a correlation between the contents of the relevant past communications with the current monitored communication. The score for the monitored communication can vary depending on the number of times a similar phrase is used and the significance of the phrase. The score is higher for monitored communications containing a higher correlation, a higher frequency of similar phrases used in the separate communications, and the use of a suspicious or illegal keyword. The score is lower for communications containing a lower correlation, a lower frequency of similar phrases used, and the use of benign phrases. In another embodiment, the separate time communication scoring module 420 accesses the key word database 288 and the score may additionally or alternatively depend on the frequency of key words detected in the monitored communication. The score is higher for monitored communications containing a higher frequency of key words.

The score comparison module 430 receives the communication scores from the real time communication scoring module 410 and the separate communication scoring module 420, according to an embodiment of the invention. The score comparison module 430 may have a memory that contains a threshold score. The threshold score is predetermined and can be adjusted by an administrator. The score comparison module 430 compares the received communication scores with the threshold score. If the communication score is higher than the threshold score, then the communication is sent to the alerting module 270 along with a notification signal for the supervising personnel at the controlled environment. If the communication is a real time communication, then the communication can be disconnected if the score is higher than the threshold score. If the communication is a separate time communication, the communication can be withheld until reviewed by the supervising personnel and future communication can be restricted if the score is higher than the threshold score.

System Operation

Figure 5:
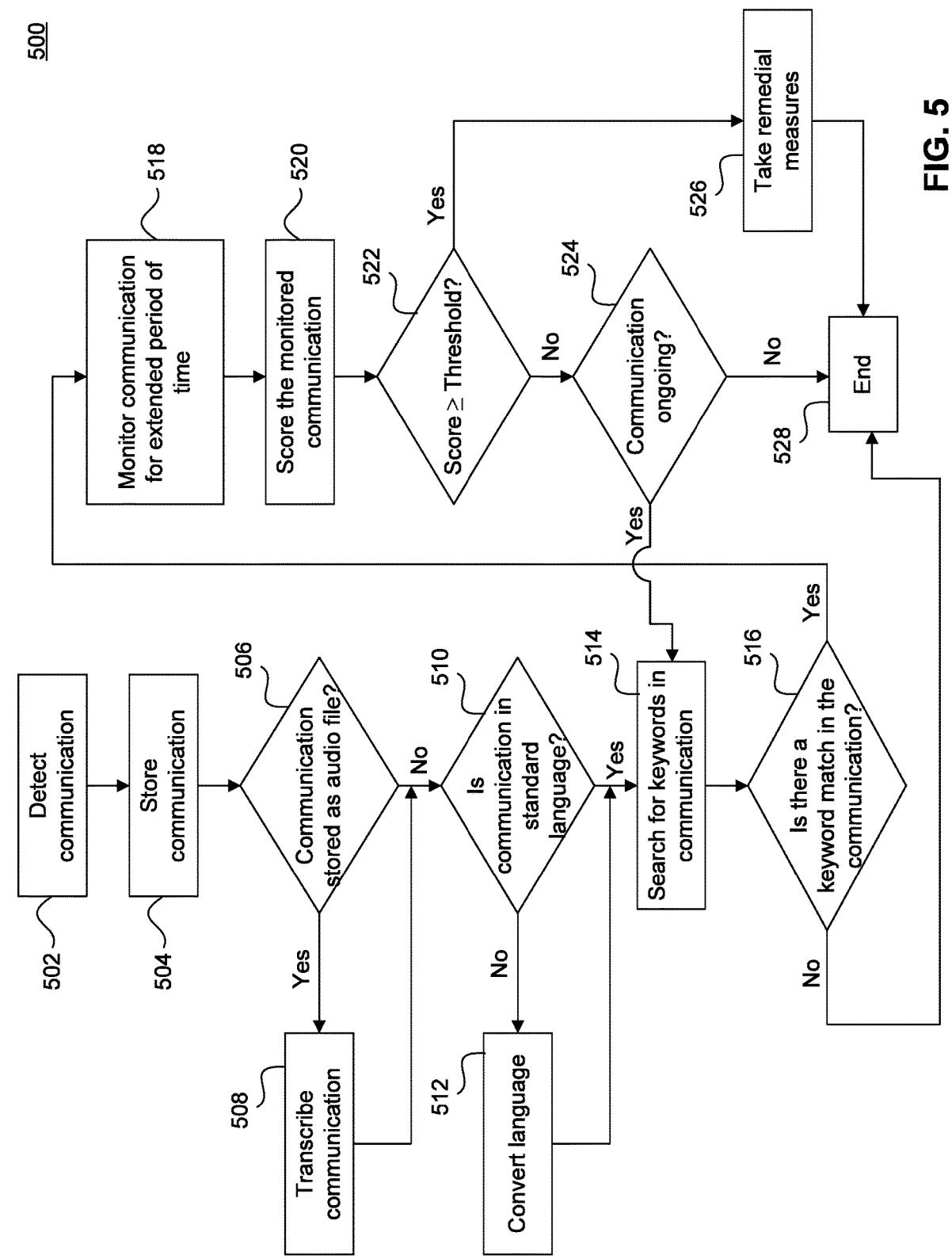
FIG. 5 illustrates a flowchart diagram of a method for detecting and preventing illegal communication, according to an embodiment of the invention.

FIG. 5 illustrates a flowchart diagram of an exemplary method 500 for detecting and preventing illegal communications. The method of FIG. 5 is described below with reference to FIGS. 2 and 3.

At the outset, a communication is detected (502). The detected communication is stored in a communication storage 220 (504) for later analysis. The communication is stored in the appropriate file format in which the communication has been detected and arranged in a queue. The system makes a determination of whether the communication is in an audio format (506). If the communication is stored as in audio format (506—Y), transcriber 230 receives and transcribes the audio file into a text file (508). The resulting text file contains the transcript of the detected communication. If the communication is not in an audio format (506—N), no transcription is needed.

The system subsequently determines whether the communication is in a standard language (510). This refers to whether the communication is in a common language employed by the analysis engine, e.g. North American English. If the communication is not in the standard language (510—N), then the language converter 240 receives the communication and converts the communication into a standard language (512). The conversion into a standard language facilitates a more efficient and universal method of monitoring the communications to detect rule violation. If the communication is in a standard language (510—Y), language conversion does not occur.

Once the communication is determined to be in the standard language, the system searches the communication for keywords that are typically used by controlled environments to monitor inmate communications (514). The system continues to search for keywords in the communication if it does not find a match (516—N). If the system finds a keyword match in the communication (516—Y), then the system monitors the communication for an extended period of time (518). The scoring module 330 receives the monitored communication and assigns a score (520) to the communication. This step is described in detail in FIG. 6.

Figure 6:
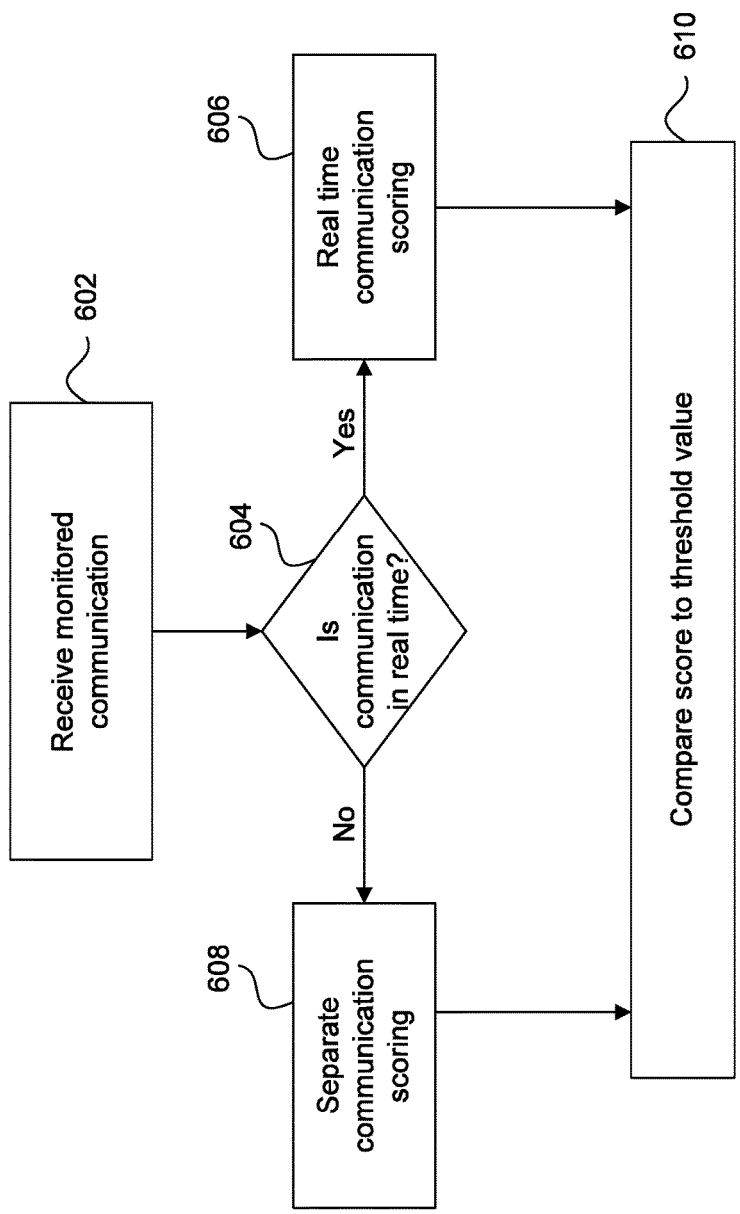
FIG. 6 illustrates a flowchart diagram of a method for scoring a monitored communication, according to an embodiment of the invention.

FIG. 6. illustrates a flowchart diagram of a method 600 for scoring a monitored message. The method of FIG. 6 is described below with reference to FIGS. 2 and 3.

The monitored communication is received by the scoring module 330 (602) in order to be analyzed and compared with relevant past communications. Next, the scoring module 330 determines whether the monitored communication is a real-time communication (604), such as a voice or video call.

If the monitored communication is determined to be a real-time communication (604—Y), the real time communication scoring module 410 compares similar phrases and keywords within the monitored communication and assigns a score (606). The focus of the real time communication scoring module 410 is to determine the similarities of words being spoken between the participants in a real time communication in relation to a past communication. The real time communication scoring module 410 compares the monitored communication with relevant past communications stored in the transcript database 284 in order to determine the similarities of words between the relevant past communications and the ongoing real time communication.

The real time communication scoring module 410 calculates a score for the monitored communication by calculating a correlation of between the contents of the monitored communication and relevant past communications. The score for the monitored communication can vary depending on the number of times a similar phrase is used and the significance of the phrase.

If the monitored communication is not a real-time communication (604—N), the separate time communication scoring module (420) compares similar phrases and keyword between the monitored communication and past communications stored in the database 280 (608). The separate time communication scoring module 420 identifies the same or similar textual content between the separate communications and calculates a score for the monitored communication. The separate time communication scoring module 420 calculates a correlation between the contents of the relevant past communications with the current monitored communication. The score for the monitored communication can vary depending on the number of times a similar phrase is used and the significance of the phrase Once the communication has been scored, the assigned score is compared to a predetermined threshold score (610/552). Referring back to FIG. 5, if the score is lower than the threshold (522—N), then the system determines whether the communication is still ongoing (524). If the communication is still ongoing (524—Y), then the system continues to search for keywords in the communication (514). If the communication has ended (524—N), the method 500 ends (528).

On the other hand, if the assigned score is higher than the threshold (522—Y), then the system takes any number of remedial measures (526), such as alerting a supervisor that a rule violation has occurred in the communication, terminating the communication (in the case of a real-time communication), withholding the communication for closure inspection (in the case of a non-real-time communication), among others. Following the remedial measures (526), the method ends (528).

Exemplary Computer System Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 7:
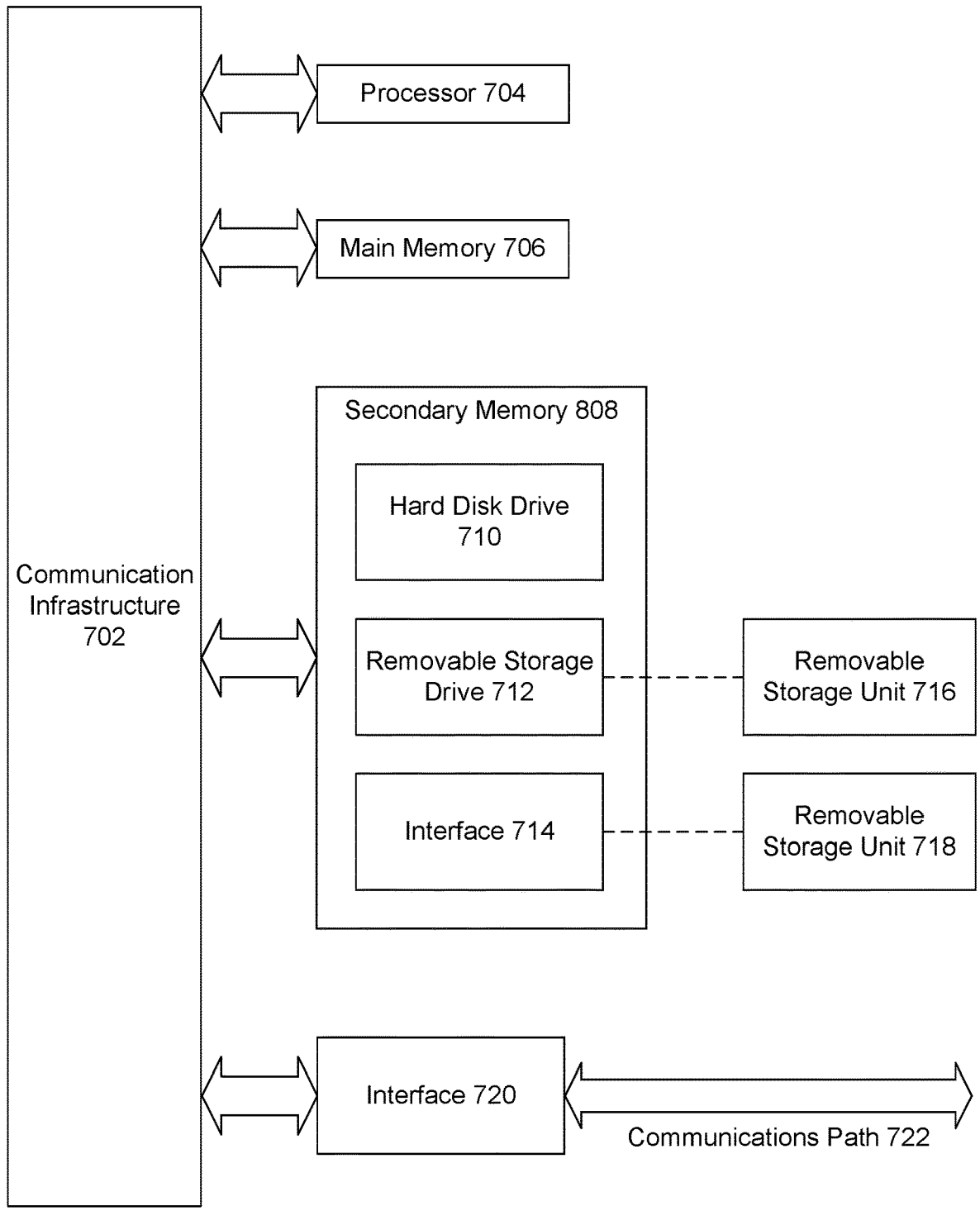
FIG. 7 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the method of flowcharts 500 and 600 can be implemented in the environment of one or more computer systems or other processing systems. An example of such a computer system 700 is shown in FIG. 7. One or more of the modules depicted in the previous figures can be at least partially implemented on one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure.

What is claimed is:

1. A communication monitoring method, comprising:
  receiving a communication that includes audio data of a recorded conversation and metadata, the metadata describing non-content information about the communication and including at least one timestamp;
  retrieving a previously-stored second communication from a database based on the metadata;
  correlating content of the received communication to content of the second communication, the correlating including:
    first comparing spoken content included in the audio data of the received communication to spoken content of the previously-stored second communication; and
    second comparing non-spoken content included in the audio data of the received communication to non-spoken content of the previously-stored second communication, the non-spoken content including speaking pauses, extra dialed digits, and progress tones;
  first determining, based on the first and second comparing, that the received communication is an inmate-to-inmate communication;
  second determining that the received communication is currently in progress; and
  terminating the communication in response to the first determining and the second determining.

2. The method of claim 1, wherein the correlating further includes:
  identifying a plurality of shared words and/or phrases that were spoken in both the received communication and the previously-stored second communication.

3. The method of claim 2, wherein the correlating further includes:
  determining, for each of the identified shared words and/or phrases, a relevancy score.

4. The method of claim 3, wherein the relevancy score is indicative of a uniqueness and/or importance of a corresponding shared word and/or phrase.

5. The method of claim 4, wherein the correlating further includes determining a frequency of each of the shared words and/or phrases.

6. The method of claim 5, wherein the frequency indicates a number of times a corresponding shared word and/or phrase appears in both the received communication and the previously-stored second communication.

7. The method of claim 1, further comprising:
assigning a score to the received communication based on the correlating;
comparing the assigned score to a predetermined threshold; and
determining the received communication to be an inmate-to-inmate communication based on the score comparison.

8. A communication monitoring system, comprising:
a database that stores previously-recorded communications;
a transceiver configured to receive a communication involving an inmate of a controlled-environment facility, the communication including audio data of a recorded conversation and metadata, the metadata describing non-content information about the communication and including at least one timestamp;
a processor configured to:
retrieve a previously-recorded communication from the database based on the metadata;
correlate content of the received communication to content of the second communication, the correlating including:
first comparing spoken content included in the audio data of the received communication to spoken content of the previously-stored second communication; and
second comparing non-spoken content included in the audio data of the received communication to non-spoken content of the previously-stored second communication, the non-spoken content including speaking pauses, extra dialed digits, and progress tones;
first determine, based on the first and second comparing, that the received communication is an inmate-to-inmate communication;
second determine that the received communication is currently in progress; and
terminate the communication in response to the first determine and the second determine.

9. The system of claim 8, the processor further configured to identify a plurality of shared words and/or phrases that were spoken in both the received communication and the previously-stored second communication.

10. The system of claim 9, the processor further configured to determine, for each of the identified shared words and/or phrases, a relevancy score.

11. The system of claim 10, wherein the relevancy score is indicative of a uniqueness and/or importance of a corresponding shared word and/or phrase.

12. The system of claim 11, wherein the processor is further configured to determine a frequency of each of the shared words and/or phrases.

13. The system of claim 12, wherein the frequency indicates a number of times a corresponding shared word and/or phrase appears in both the received communication and the previously-stored second communication.

14. The system of claim 11, wherein the processor is further configured to:
assign a score to the received communication based on the correlating;
compare the assigned score to a predetermined threshold; and
determine the received communication to be an inmate-to-inmate communication based on the score comparison.

15. A method of identifying an inmate-to-inmate communication, comprising:
receiving an inmate communication that includes audio data and metadata, the metadata describing non-content information about the inmate communication and including at least one timestamp;
selecting a previously-stored communication having metadata that overlaps the metadata of the received communication;
correlating content of the received communication to content of the second communication, the correlating including:
first comparing spoken content of the received communication to spoken content of the selected previously-stored communication; and
second comparing non-spoken content of the received communication to non-spoken content of the selected previously-stored communication, the non-spoken content including speaking pauses, extra dialed digits, and progress tones;
first determining, based on the correlating, whether the received communication is an inmate-to-inmate communication;
second determining that the received communication is currently in progress; and
terminating the communication in response to the first determining and the second determining.

16. The method of claim 15, further comprising transcribing the audio data of the received inmate communication using speech recognition.

17. The method of claim 16, wherein the first comparing includes comparing the transcribed audio data of the received inmate communication to transcribed audio data of the previously-stored communication.

18. The method of claim 15, further comprising assigning a score to the received inmate communication based on the first comparing and the second comparing.

19. The method of claim 18, wherein the first comparing includes:
identifying a key word in the received communication;
determining whether the key word appears in the previously-stored communication; and
determining a frequency with which the key word appears in both the received inmate communication and the previously-stored communication.

20. The method of claim 19, further comprising assigning a score to the received communication based on the first comparing and the second comparing.

* * * * *